(12) United States Patent
Wang et al.

(10) Patent No.: US 8,903,136 B1
(45) Date of Patent: Dec. 2, 2014

(54) CLIENT SIDE FILTERING OF CARD OCR IMAGES

(71) Applicant: Google Inc., Mountain View, CA (US)

(72) Inventors: Xiaohang Wang, Jersey City, NJ (US); Alessandro Bissacco, Los Angeles, CA (US); Glen Berntson, Jersey City, NJ (US); Marria Nazif, San Francisco, CA (US); Justin Scheiner, Oceanside, NY (US); Sam Shih, Long Island City, NY (US); Mark Leslie Snyder, Oakland, CA (US); Daniel Talavera, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/133,232

(22) Filed: Dec. 18, 2013

Related U.S. Application Data

(60) Provisional application No. 61/904,801, filed on Nov. 15, 2013.

(51) Int. Cl.
*G06K 9/00* (2006.01)
*G06K 9/18* (2006.01)

(52) U.S. Cl.
CPC .............. *G06K 9/00463* (2013.01); *G06K 9/18* (2013.01)
USPC ............................ 382/112; 382/137; 382/321

(58) Field of Classification Search
CPC ............. G06K 9/20; G06K 9/58; G06K 9/82; G06K 2209/01; G06K 2209/015
USPC .......................................... 382/100, 112, 321
See application file for complete search history.

(56) References Cited

U.S. PATENT DOCUMENTS

| | | | | |
|---|---|---|---|---|
| 7,587,066 | B2* | 9/2009 | Cordery et al. | 382/112 |
| 8,433,127 | B1* | 4/2013 | Harpel et al. | 382/139 |
| 8,610,966 | B2* | 12/2013 | Hatzav et al. | 358/474 |
| 2013/0075466 | A1* | 3/2013 | Clark et al. | 235/379 |
| 2013/0120595 | A1* | 5/2013 | Roach et al. | 348/207.1 |

* cited by examiner

*Primary Examiner* — Shefali Goradia

(74) *Attorney, Agent, or Firm* — Johnson, Marcou & Isaacs, LLC

(57) ABSTRACT

The technology of the present disclosure includes computer-implemented methods, computer program products, and systems to filter images before transmitting to a system for optical character recognition ("OCR"). A user computing device obtains a first image of the card from the digital scan of a physical card and analyzes features of the first image, the analysis being sufficient to determine if the first image is likely to be usable by an OCR algorithm. If the user computing device determines that the first image is likely to be usable, then the first image is transmitted to an OCR system associated with the OCR algorithm. Upon a determination that the first image is unlikely to be usable, a second image of the card from the digital scan of the physical card is analyzed. The optical character recognition system performs an optical character recognition algorithm on the filtered card.

19 Claims, 5 Drawing Sheets

CLIENT SIDE FILTERING OF CARD OCR IMAGES

RELATED APPLICATION

This application claims priority under 35 U.S.C. §119 to U.S. Patent Application No. 61/904,801 filed Nov. 15, 2013 and entitled "Client Side Filtering of Card OCR Images." The entire contents of the above-identified application are hereby fully incorporated herein by reference.

TECHNICAL FIELD

The technology disclosed herein pertains to extracting financial card information, and more particularly to filtering images with a user device before uploading images for optical character recognition.

BACKGROUND

When consumers make online purchases or purchases using mobile devices, they are often forced to enter loyalty card information or credit card information into the mobile device for rewards or payment. Due to the small screen size and keyboard interface on a mobile device, such entry is generally cumbersome and prone to errors. Users may use many different cards for purchases, such as credit cards, debit cards, stored value cards, and other cards. Information entry difficulties are multiplied for a merchant attempting to process mobile payments on mobile devices for multiple transactions.

Current applications for obtaining payment information or other card data from a card require a precise positioning of the card in the scan. Typically, a box is presented on the user interface of the user computing device. The user is required to precisely line the card up with the box to allow the user computing device to capture an image of the card.

In certain systems, a user device uploads multiple images for the system to process. The system may request additional images when adequate results are not obtained. To obtain a usable image for uploading, the user may alter the position of the image capturing device, change the lighting, or perform any function to improve the image. If the user device is transmitting images to the system before a good image is captured, the processing capacity required to upload multiple images may become burdensome. Current applications do not allow the user computing device to filter the images to reduce the need to transmit unusable images.

SUMMARY

The technology of the present disclosure includes computer-implemented methods, computer program products, and systems to filter images before transmitting to a system for optical character recognition ("OCR"). A user computing device obtains a first image of the card from the digital scan of a physical card and analyzes features of the first image, the analysis being sufficient to determine if the first image is likely to be usable by an OCR algorithm. If the user computing device determines that the first image is likely to be usable, then the first image is transmitted to an OCR system associated with the OCR algorithm. Upon a determination that the first image is unlikely to be usable, a second image of the card from the digital scan of the physical card is analyzed. The optical character recognition system performs an optical character recognition algorithm on the filtered card.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
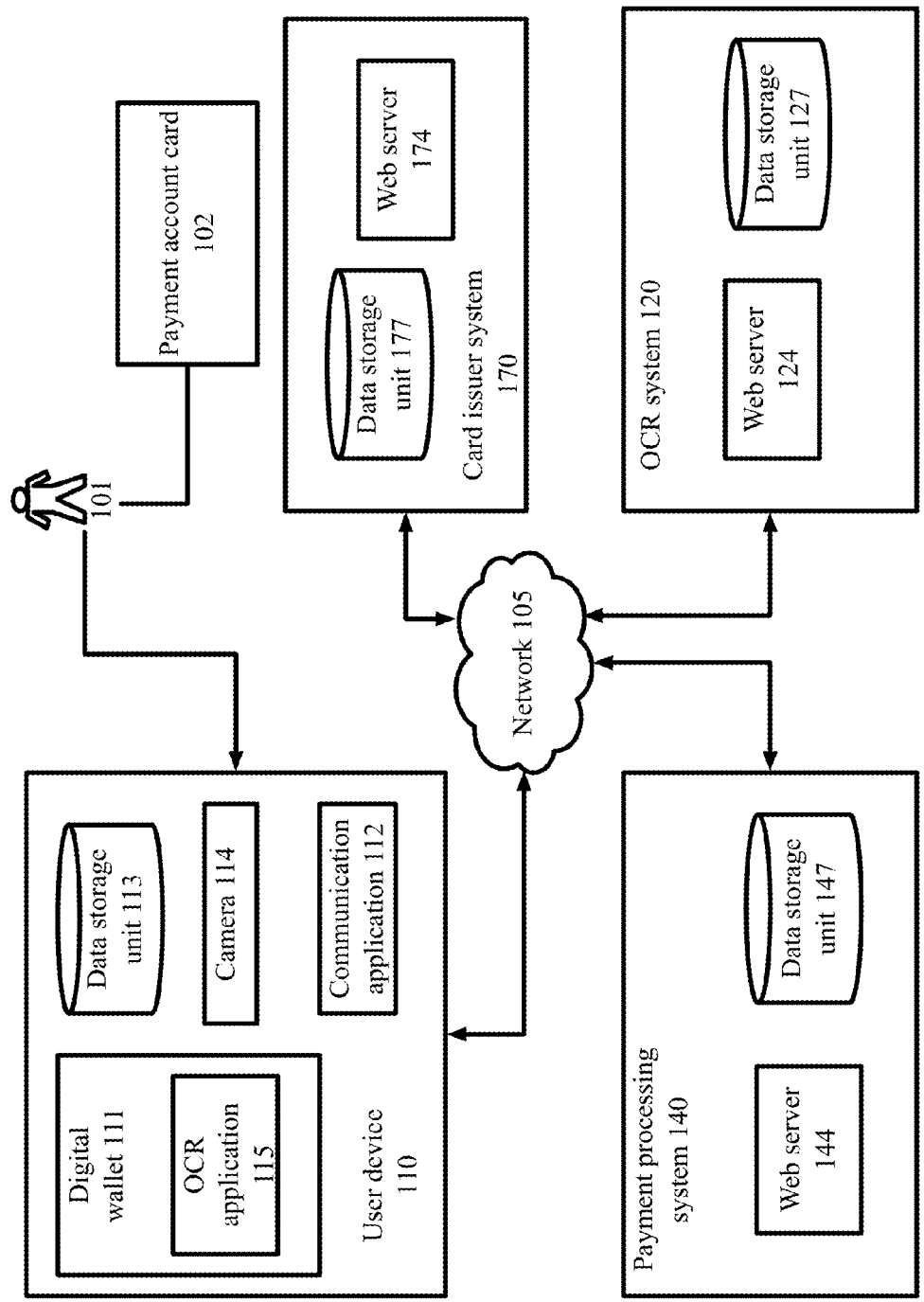
FIG. 1 is a block diagram depicting a system to filter card OCR images, in accordance with certain example embodiments of the technology disclosed herein.

Embodiments herein provide computer-implemented techniques for allowing a user computing device to filter images before uploading the images to a system to extract card information from loyalty cards, payment cards, or other cards using optical character recognition ("OCR"). The user computing device determines if a scanned image meets a set of requirements before transmitting the image to an OCR system for processing. For example, the OCR application may determine whether the image is blurry or clear, whether the image is bright enough for data extraction, and/or whether text exists in the expected portions of the image. If the image meets the requirements for processing, then the image is transmitted to the OCR system to undergo the OCR process. The procedure may be repeated with additional images until a set of results exceeds the configured threshold.

Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account or other record of a user or other information thereon. Example embodiments described herein may be applied to the images of other items, such as receipts, boarding passes, tickets, and other suitable items. The card may also be an image or facsimile of the card. For example, the card may be a representation of a card on a display screen or a printed image of a card.

The user may employ the card when making a transaction, such as a purchase, ticketed entry, loyalty check-in, or other suitable transaction. The user may obtain the card information for the purpose of importing the account represented by the card into a digital wallet application module or for other digital account purposes. The card is typically a plastic card containing the account information and other data on the card. In many card embodiments, the customer name, expiration date, and card numbers are physically embossed on the card. The embossed information is visible from both the front and back of the card, although the embossed information is typically reversed on the back of the card.

A user may desire to enter the information from the card into a mobile user computing device or other computing device, for example, to use a loyalty card in and online or physical merchant location, to conduct an online purchase, to conduct a purchase at a merchant location, to add the information to a wallet application on a user computing device, or for any other suitable reason. In an example, the user desires to use a mobile user computing device to conduct a purchase transaction using a digital wallet application module executing on the mobile user computing device. The digital wallet application module may require an input of the details of a particular user payment account to conduct a transaction with the particular user payment account or to set up the account. Due to the small screen size and keyboard interface on a mobile device, such entry can be cumbersome and error prone. Additionally, a merchant system may need to capture card information to conduct a transaction or for other reasons.

The user employs a mobile phone, digital camera, or other user computing device to capture a scan of the card associated with the account that the user desires to input into the user computing device.

An OCR application on the user computing device receives a scan of the card. The scan, or digital scan, may be a video of the card, a series of images of the card, or data from any other suitable scanning technology. In certain embodiments, the OCR application may receive single images for processing until a subsequent image is requested. The image or images may be obtained from the camera module of a user computing device, such as the camera on a mobile phone. The images may be obtained from any digital image device coupled to the user computing device or any other suitable digital imaging device. The images may be accessed by the OCR application on the user computing device from a storage location on the user storage device, from a remote storage location, or from any suitable location. All sources capable of providing the image will be referred to as a "camera."

An OCR application receives the images of the card from the camera. The functions of the OCR application may be performed by any suitable module, hardware, software, or application operating on the user computing device. Some, or all, of the functions of the OCR application may be performed by a remote server or other computing device, such as the server operating in an OCR system. For example, a digital wallet application module on the user computing device may obtain the images of the card and transmit the images to the OCR system for processing. In another example, some of the OCR functions may be conducted by the user computing device and some by the OCR system or another remote server. Examples provided herein may indicate that many of the functions are performed by an OCR application on the user computing device and by the OCR system, but some or all of the functions may be performed by any suitable computing device.

In an example, the image of the card is presented on the user interface of the user computing device as a live video image of the financial card. The OCR application isolates and stores one or more images from the video feed of the camera. The OCR application may store a scan of the card as a video or other suitable format comprising multiple images of the card. For example, the user may hover the camera function of a user computing device over a financial card and observe the representation of the financial card on the user interface of the user computing device. The user may actuate a real or virtual button on the user computing device to capture a preferred image or group of images. The OCR application may select the preferred images automatically. In an alternate embodiment, the OCR application stores only one image at a time.

In certain examples, some or all of the functions described are performed while the scan is active. For example, the user may hover the camera of a user computing device over the card and the methods described herein are performed with live images of the card. That is, the OCR application captures and utilizes images from the active feed of the camera.

The OCR application determines if the image meets minimum requirements to be transmitted to the OCR system for processing. Examples of characteristics of the image that may be used to filter out images that are not useful are the blurriness of the image, the brightness of the image, and whether the image contains text.

For example, the OCR application, the camera module, or the user computing device, or other computing device performs blur detection on the images. The image may be recognized as blurry, overly bright, overly dark, or otherwise obscured in a manner that prevents a high resolution image from being obtained. In response to a detection of blurriness, the OCR application, or other function of the user computing device or the camera, may adjust the image capturing method to reduce the blur in the image. For example, the OCR application may direct the camera to adjust the focus on the financial card. In another example, the OCR application may direct the user to move the camera closer to, or farther away from, the financial card. In another example, the OCR application may perform a digital image manipulation to remove the blur. Any other method of correcting a blurred image can be utilized.

The OCR application determines if the image is bright enough for the OCR system to discern the text while containing no areas that are too bright. For example, some parts of the image might have an appropriate brightness while another part of the image may have a bright spot due to a flash, reflection, or other source of light. The OCR application may require that the entire image is of an appropriate brightness.

The OCR application determines if the image contains text. The OCR application may further determine if the text is located in an expected area of the image. For example, the OCR application may predict that a credit card number should contain a row of digits at the bottom of the card indicative of a user account number. The OCR application may run a classification on the image to determine if text is likely to be contained in the predicted areas of the image.

The feature levels of each requirement are configurable to achieve a desired result. For example, increased brightness in a image typically equals better image quality so the OCR system would be more likely to obtain acceptable results. Thus, a brightness level over a configurable threshold should be less likely to be produce an OCR result that has a low confidence level. The configured thresholds for each feature are configured to optimize the likelihood that a useful image is transmitted to the OCR system. In another example, the less blurry, and more clear, an image is makes it less likely to reject by the OCR system. Any other requirement could be similarly configured to produce images that are not likely to be rejected by the OCR system.

If the requirements are met, then the OCR application uploads the image to be processed by the OCR system. The OCR application may transmit the image via an Internet connection over the network, text, email, or any suitable manner.

The OCR system receives the filtered image and proceeds to perform an OCR process on the image.

The OCR system may crop the images to display only the desired information from the card. In an example, if the card in the image is a credit card, the OCR system accesses information associated with the expected location of the account number of a credit card. The expected location may be obtained from a database of card layouts stored on the user computing device or in another suitable location. For example, credit cards, driver's licenses, loyalty cards, and other cards typically meet an industry standard for the data locations and the layout of the card. The industry standards may be stored in the OCR application or in a location accessible by the OCR application.

The OCR system applies an OCR algorithm to the card image to identify the information on the card. The information may be digits, characters, or other data or information. Each instance of information will be referred to as a "digit." The OCR algorithm may represent any process, program, method, or other manner of recognizing the digits represented on the card image. The OCR system extracts the digits and may display the extracted digits on the user interface of the user computing device. The OCR system may categorize groups of digits into categories such as account numbers, user name, expiration date, card issuer, or other suitable data. The OCR system may categorize the groups of digits by comparing the formats of groups of digits to a database of formats. For example, if the results of the OCR algorithm on a group of digits is "10/15", then the OCR system may interpret the format as being associated with an expiration date.

The OCR system determines a confidence level of the results of the OCR process. In an example, the OCR system may determine the confidence level for each digit by determining the difference in the confidence level between the top two digit candidates. That is, the OCR system may determine that a digit meets many of the characteristics of a "1" and assess a score to a particular digit of 80%. The OCR system may determine that the same digit meets many of the characteristics of a "7" and assess a score to a particular digit of 60%. Then, the OCR system may assess a particular confidence level based on the difference between the two digit scores.

The OCR system may determine the confidence level for all of the data on the card based on the confidence levels, or scores, of the individual digits. For example, the OCR system may average the digit scores, sum the digit scores, or perform any other suitable action to the digit scores. In an example of a card image comprising 20 digits, the OCR system may determine that the confidence level of the accuracy of 10 of the digits was 90% and the confidence level of the accuracy of the other 10 digits was 80%. The OCR system may perform an average of the confidence levels and determine that the overall confidence level was 85%.

The OCR application, the user, the OCR system, the payment processing system, or any suitable party determines a threshold confidence level for the results of the OCR algorithm. For example, a user may input a requirement into the OCR system that the OCR system must produce a result with a confidence level that the digits are 90% likely to be accurate.

If the results of the OCR algorithm are equal to or greater than the configured threshold, the OCR system supplies the extracted data to a digital wallet application module, point of sale terminal, payment processing system, website, or any suitable application or system that the user desires. The extracted data may be used by an application on the user computing device. The extracted data may be transmitted via an Internet connection over the network, via a near field communication ("NFC") technology, emailed, texted, or transmitted in any suitable manner.

If the results of the OCR algorithm are below the configured threshold, then the OCR system may obtain a new image from the OCR application. For example, the OCR application may access additional images from the scan stored in the user computing device or in another suitable location. The OCR application may access additional images from the live scan from the camera. In another example, the OCR application may scan the card again and capture additional images for analysis. Any other suitable method may be utilized to obtain additional images.

The OCR application filters the images using the process described herein. Upon identifying a new image that meets the requirements, the OCR application transmits the new image to the OCR system for processing.

The OCR system applies the OCR algorithm to the new images. The OCR application may continue the process of requesting new images and processing the image until the confidence level threshold is met or exceeded. The OCR system may repeat the method described herein for a configured number of attempts. For example, the OCR system may attempt to obtain matching results for 5 or 10 additional of images. The OCR system or the OCR application may then reject the results or provide further instructions to the user.

Example System Architecture

Turning now to the drawings, in which like numerals represent like (but not necessarily identical) elements throughout the figures, example embodiments are described in detail.

FIG. 1 is a block diagram depicting a computing system to filter card OCR images, in accordance with certain example embodiments. As depicted in FIG. 1, the system 100 includes network computing devices 110, 120, 140, and 170 that are configured to communicate with one another via one or more networks 105. In some embodiments, a user 101 associated with a device must install an application and/or make a feature selection to obtain the benefits of the techniques described herein.

Each network 105 includes a wired or wireless telecommunication means by which network devices (including devices 110, 120, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 120, 140, and 170 includes a device having a communication module capable of transmitting and receiving data over the network 105. For example, each network device 110, 120, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 170 are operated by end-users or consumers, OCR system operators, payment processing system operators, and card issuer operators, respectively.

The user 101 can use the communication application 112, which may be, for example, a web browser application or a stand-alone application, to view, download, upload, or otherwise access documents or web pages via a distributed network 105.

The user computing device 110 may employ a communication module 112 to communicate with the web server 124 of the OCR system 120 or other servers. The communication module 112 may allow devices to communicate via technologies other than the network 105. Examples might include a cellular network, radio network, or other communication network.

The user device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 may interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115.

The OCR application 115 may be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system 120, the user computing device 110, the digital wallet application module 111, a merchant system (not pictured) or any other suitable hardware or software system or application. In an example, the OCR application 115 on the user computing device 110 may obtain an image of a card 102 and transmit the image to the OCR system 120 to extract the information on the card 102.

The user device 110 includes a data storage unit 113 accessible by the OCR application 115, the web browser application 112, or any suitable computing device or application. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The payment processing computing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a credit card issuer, a debit card issuer, a stored value issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 144. The card issuer employs a card issuer computing system 170 to issue the cards, manage the user account, and perform any other suitable functions. The card issuer system 170 may alternatively issue cards used for identification, access, verification, ticketing, or cards for any suitable purpose. The card issuer system 170 may employ a web server 177 to manage the user account and issue cards 102. The card issuer system 170 includes a data storage unit 174. The exemplary data storage unit 177 can include one or more tangible computer-readable media. The data storage unit 177 can be stored on the card issuer system 170 or can be logically coupled to the card issuer system 170. For example, the data storage unit 177 can include on-board flash memory and/or one or more removable memory cards or removable flash memory.

The OCR computing system 120 utilizes an OCR system web server 124 operating a system that produces, manages, stores, or maintains OCR algorithms, methods, processes, or services. The OCR system web server 124 may represent the computer implemented system that the OCR system 120 employs to provide OCR services to user computing devices 110, merchants, or any suitable part. The OCR system web server 124 can communicate with one or more payment processing systems 140, a user device 110, or other computing devices via any available technologies. These technologies may include, but would not be limited to, an Internet connection via the network 105, email, text, instant messaging, or other suitable communication technologies. The OCR system 120 may include a data storage unit 127 accessible by the web server 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other mechanisms of establishing a communications link between the computers and devices can be used. Additionally, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

Figure 2:
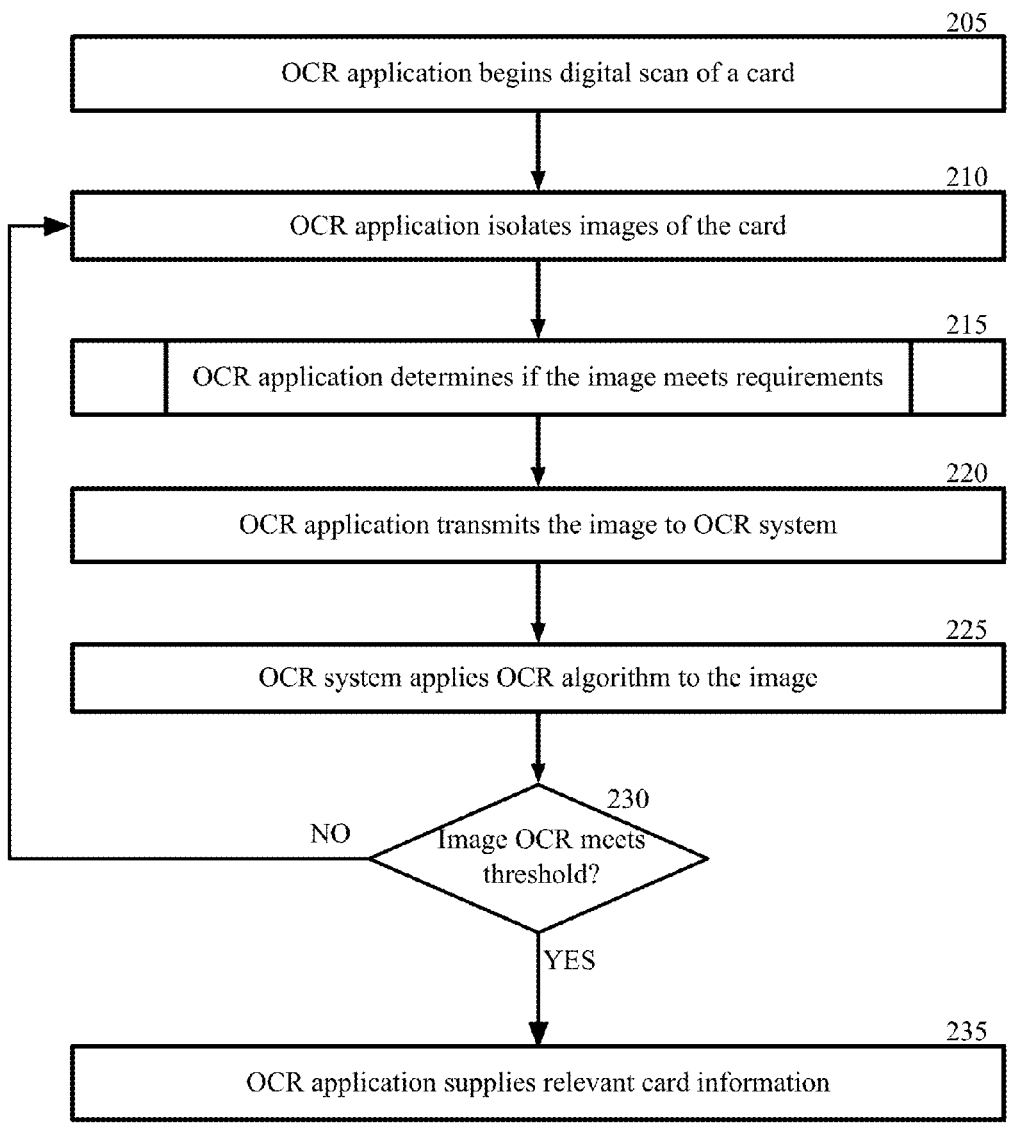
FIG. 2 is a block flow diagram depicting methods to filter card OCR images, in accordance with certain example embodiments.
Figure 3:
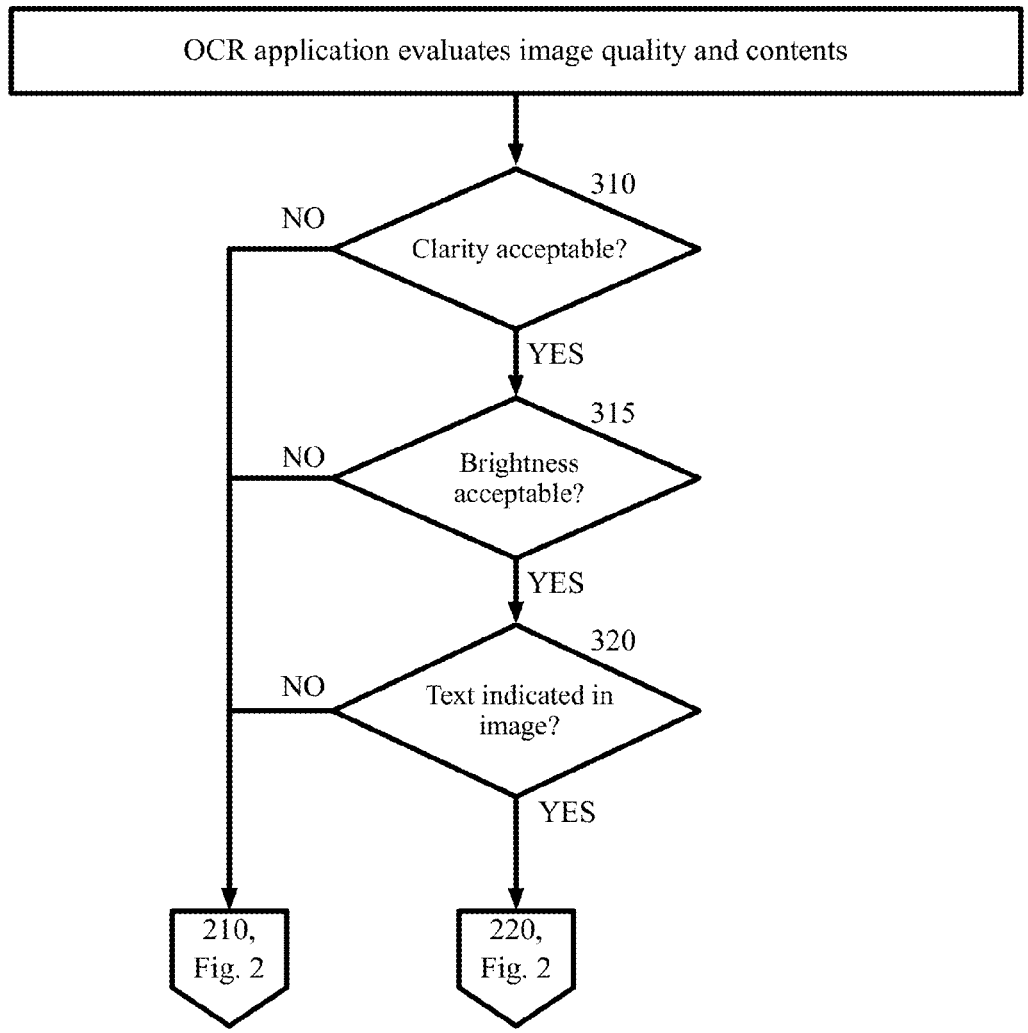
FIG. 3 is a block flow diagram depicting methods for determining if an image meets filtering requirements, in accordance with certain example embodiments.

The example methods illustrated in FIG. 2-3 are described hereinafter with respect to the components of the example operating environment 100. The example methods of FIG. 2-3 may also be performed with other systems and in other environments.

FIG. 2 is a block flow diagram depicting a method 200 to filter card optical character recognition ("OCR") images, in accordance with certain example embodiments.

With reference to FIGS. 1 and 2, in block 205, OCR application 115 on the user device 110 begins a digital scan of a card 102. The scan may be obtained from the camera module 114 of a user computing device 110, such as the camera 114 on a mobile phone. The scan may be obtained from any digital image device coupled to the user computing device 110 or any other suitable digital imaging device. The images may be accessed by the OCR application 115 on the user computing device 110 from a storage location on the user storage device 110, from a remote storage location, or from any suitable location. All sources capable of providing the scan will be referred to as a "camera."

The functions of the OCR application 115 may be performed by any suitable module, hardware, software, or application operating on the user computing device 110. Some, or all, of the functions of the OCR application 115 may be performed by a remote server or other computing device, such as the server 124 operating in an OCR system 120. For example, a digital wallet application module 111 on the user computing device 110 may obtain the images of the card 102 and transmit the images to the OCR system 120 for processing. In another example, some of the OCR functions may be conducted by the user computing device 110 and some by the OCR system 120 or another remote server. Examples provided herein may indicate that many of the functions are performed by an OCR application 115 on the user computing device 110, but some or all of the functions may be performed by any suitable computing device.

The image of the card 102 is presented on the user interface of the user computing device 110 as, for example, a live video image of the card 102. The OCR application 115 may isolate and store one or more images from the video feed of the camera 114. The OCR application 115 may store a scan of the card 102 as a video or other suitable format comprising multiple images of the card 102. For example, the user 101 may hover the camera 114 of a user computing device 110 over a financial card 102 and observe the representation of the financial card 102 on the user interface of the user computing device 110. The user 101 may actuate a real or virtual button on the user computing device 110 to capture a preferred image, a group of images, or a digital scan. The OCR application 115 may select the preferred images automatically.

In certain examples, some or all of the functions described are performed while the scan is active. For example, the user 101 may hover the camera 114 of a user computing device 110 over the card and the methods described herein are performed with live images of the card 102. That is, the OCR application 115 captures and utilizes images from the active feed of the camera 114.

Figure 4:
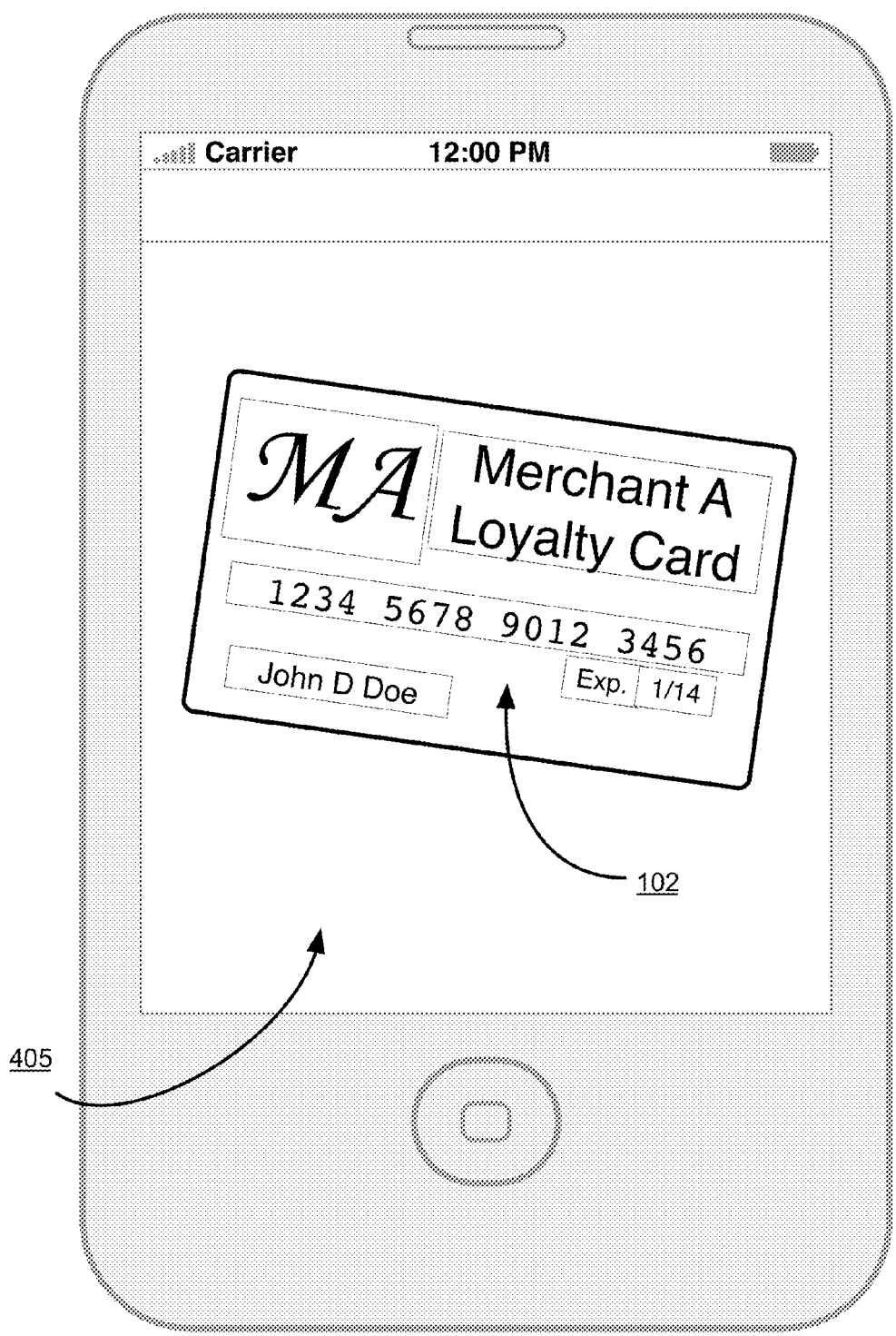
FIG. 4 is an illustration of a user computing device displaying an image of a loyalty card, in accordance with certain example embodiments.

An illustration of the card 102 displayed on the user computing device 110 is presented in FIG. 4.

FIG. 4 is an illustration of a user computing device 110 displaying an image of a loyalty card, in accordance with certain example embodiments. The user computing device 110 is shown as a mobile smartphone. The user computing device 110 is shown with a display screen 405 as a user interface. The card 102 is shown displayed on the user computing device 110 as the user 101 is capturing the image of the card 102.

Returning to FIG. 2, in block 210, the OCR application 115 isolates images of the card 102 for filtering. The isolated image may be extracted from the scan of the card 102. The image may be extracted from a stored scan or from a live scan of the card 102. The OCR application 115 may isolate the first image of the card 102. Alternatively, the OCR application 115 may isolate an image after the camera 114 has stabilized for a configured period of time. Alternatively, the OCR application 115 may isolate an image after the user 101 provides an indication. The OCR application 115 isolate any single image from the scan according to any configured procedure.

In block 215, the OCR application 115 determines if the image meets a set of requirements to be sent to the OCR system 120 for OCR processing. Block 215 is described in greater detail in the method 215 of FIG. 3.

FIG. 3 is a block flow diagram depicting a method 215 for determining if an image meets filtering requirements, in accordance with certain example embodiments.

In block 305, the OCR application 115 evaluates image quality and contents. The feature levels of each requirement for image quality are configurable to achieve a desired result. For example, increased brightness in a image typically equals better image quality so the OCR system 120 would be more likely to obtain acceptable results. Thus, a brightness level over a configurable threshold should be less likely to be produce an OCR result that has a low confidence level. The configured thresholds for each feature are configured to optimize the likelihood that a useful image is transmitted to the OCR system 120. In another example, the less blurry, and more clear, an image is makes it less likely to reject by the OCR system 120. Any other requirement could be similarly configured to produce images that are not likely to be rejected by the OCR system 120.

In an example, the OCR application 115, the camera module 114, or the user computing device 110, or other computing device performs blur detection on the images. The image may be recognized as blurry, overly bright, overly dark, or otherwise obscured in a manner that prevents a high resolution image from being obtained. The blur detection may be performed by any image processing program, application, or algorithm that is capable of determining image clarity.

In the example, the OCR application 115 detects the brightness of the image. The OCR application 115 determines if the image is bright enough for the OCR system 120 to discern the text while containing no areas that are too bright. For example, some parts of the image may have an appropriate brightness while another part of the image may have a bright spot due to a flash, reflection, or other source of light. The OCR application 115 may employ any hardware of software method or process to determine the brightness of the image.

In the example, the OCR application 115 determines if text is indicated in the image. The OCR application 115 may further determine if the text is located in an expected area of the image. For example, the OCR application 115 may predict that a credit card number should contain a row of digits at the bottom of the card indicative of a user account number. The OCR application 115 may run a classification on the image to determine if text is likely to be contained in the predicted areas of the image. The classification may be any algorithm or program that classifies edges, lines, or other characteristics of the image that may be indicative of text. The classifier may determine that a given section of the image contains lines that are likely to be text.

The OCR application 115 may determine a confidence level of the results of the classification. For example, the OCR application 115 determines that the classifier indicates an 80% probability that the image comprises an appropriate amount of text. The OCR application 115 determines if the confidence level is greater than a configured threshold.

Any other suitable filtering requirement may be utilized by the OCR application 115. The filtering requirements may be related to any characteristic of the image that prevents images from being transmitted that are likely to be rejected by the OCR system 120.

In block 310, the OCR application 115 determines if the clarity is acceptable. If the amount of blur is below a threshold and the image is predicted to be clear enough to be acceptable to the OCR system 120, then the method 215 proceeds to block 315. If the image is overly blurry, then the method 215 proceeds back to block 210 of FIG. 2.

In block 315, the OCR application 115 determines if the brightness is acceptable. If the brightness is within a minimum and maximum threshold and the image is predicted to be bright enough to be acceptable to the OCR system 120, then the method 215 proceeds to block 320. If the image is overly bright, not bright enough, contains bright spots, or otherwise is unacceptable, then the method 215 proceeds back to block 210 of FIG. 2.

In block 320, the OCR application 115 determines if text is indicated in the image. If the probability that the amount and/or the location of text are determined below the threshold, then the method 215 proceeds to block 220 of FIG. 2. If the probability that the image contains an appropriate amount of text is below the threshold, then the method 215 proceeds back to block 210 of FIG. 2.

When the method 215 returns to block 210, the OCR application 115 isolates an additional image of the card 102, as described herein. The additional image is filtered as described in method 215. The process may be repeated until an image is analyzed and determined to meet the requirements. The acceptable image is then transmitted to the OCR system 120. In certain embodiment, the OCR application 115 informs, via a user interface of the user device 110, the user 101, the camera 114, or any suitable entity of the reason for the failure. For example, if the image was determined to be blurry, the OCR application 115 may request that the user 101 adjust the position of the camera 114. The OCR application 115 may request that the camera 114 adjust the focus on the card 102. Any suitable request or recommendation may be issued by the OCR application 115 to improve a subsequent image.

Returning to FIG. 2, in block 220, the OCR application 115 transmits an image that meets the requirements to the OCR system 120. The OCR application 115 may transmit the image via an Internet connection over the network, text, email, or any suitable manner.

In block 225, the OCR system 120 applies an OCR algorithm to the image. The OCR system 120 may crop the image to display only the desired information from the card 102. For example, if the card 102 in the image is a credit card, the OCR application 115 accesses information associated with the expected location of the account number of a credit card. The expected location may be obtained from a database of card layouts stored on the user computing device 110 or in another suitable location. Credit cards, driver's licenses, loyalty cards, and other cards typically meet an industry standard for the data locations and the layout of the card. The industry standards may be stored in the OCR system 120 or in a location accessible by the OCR system 120. In certain circumstances, the data locations may be provided by the issuer of the card 102.

The information on the card may be digits, characters, or other data or information. Each instance of information or data will be referred to as a "digit." The OCR algorithm may represent any process, program, method, or other manner of recognizing the digits represented on the card image. The groups may be sorted into categories such as account numbers, user name, expiration date, card issuer, or other suitable data. The OCR system 120 may categorize the groups of digits by comparing the formats of groups of digits to a database of formats. For example, if the results of the OCR system 120 on a group of digits is "10/15", then the OCR system 120 may interpret the format as being associated with an expiration date.

In block 230, the OCR application 115 compares a confidence level of the results from applying the OCR algorithm to a threshold. In an example, the OCR system 120 may determine the confidence level for each digit by determining the difference in the confidence level between the top two digit candidates. That is, the OCR system 120 may determine that a digit meets many of the characteristics of a "1" and assess a score to a particular digit of 80%. The OCR system 120 may determine that the same digit meets many of the characteristics of a "7" and assess a score to a particular digit of 60%. Then, the OCR system 120 may assess a particular confidence level based on the difference between the two digit scores.

The OCR system 120 may determine the confidence level for all of the data on the card 102 based on the confidence levels, or scores, of the individual digits. Any manner of assessing a confidence level may be used. For example, the OCR application 115 may use a machine learning algorithm to determine the likelihood that a digit is correct. The machine learning algorithm may be updated with some or all of the verifications or revisions of the results by the user 101, or an operator of the OCR system 120, or any suitable person.

For example, the OCR system 120 may average the digit scores, sum the digit scores, or perform any other suitable action to the digit scores. In an example of a card image comprising 20 digits, the OCR system 120 may determine that the confidence level of the accuracy of 10 of the digits was 90% and the confidence level of the accuracy of the other 10 digits was 80%. The OCR system 120 may perform an average of the confidence levels and determine that the overall confidence level was 85%.

The OCR application 115, the user 101, the OCR system 120, the payment processing system, or any suitable party determines a threshold confidence level for the results of the OCR algorithm 115. For example, a user 101 may input a requirement into the OCR system 120 that the OCR system 120 must produce a result that is 90% likely to be accurate.

The method 200 determines if the confidence level of the results of the OCR algorithm are equal to or greater than the configured threshold. If the result is equal to or greater than the configured threshold, then the method 200 proceeds to block 235. If the result is below the configured threshold, then the method 200 proceeds to block 210.

When the method 200 returns to block 210, the OCR application 115 isolates an additional image of the card 102, as described herein. The additional image is filtered as described in method 215 and a new image is transmitted to the OCR system 120 for processing. The process may be repeated until an image is determined to meet the confidence level threshold.

Returning to block 235, the OCR system 120 supplies the extracted data to the OCR application 115, digital wallet application module 111, point of sale terminal, payment processing system 140, a website, or any suitable application or system that the user 101 desires. The extracted data may be used by an application on the user computing device 110. The extracted data may be transmitted via an Internet connection over the network 105, via a near field communication ("NFC") technology, emailed, texted, or transmitted in any suitable manner.

Other Example Embodiments

Figure 5:
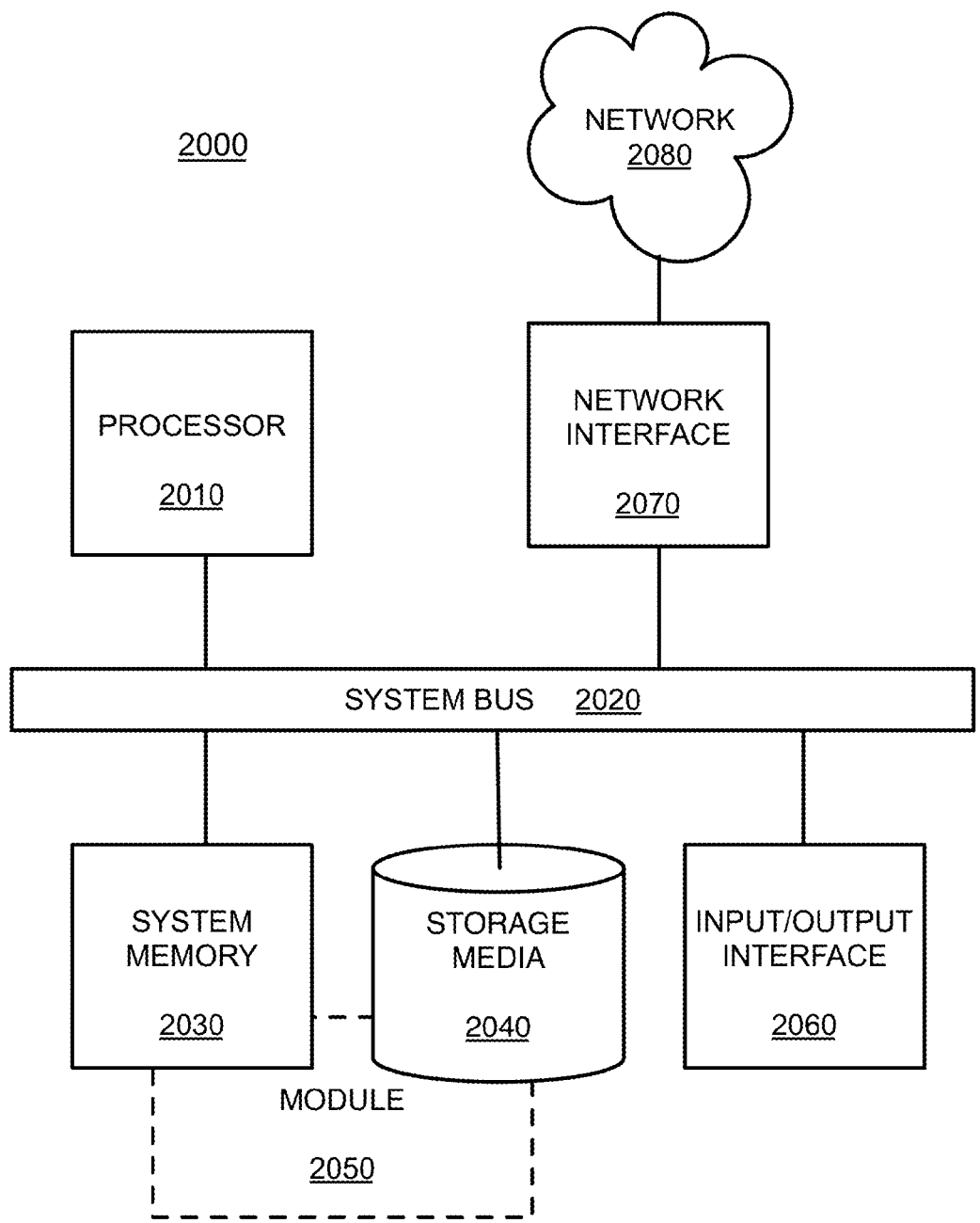
FIG. 5 is a block diagram depicting a computing machine and a module, in accordance with certain example embodiments.

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to filter images, comprising:
capturing, by a mobile computing device, a first image of a card;
analyzing, by the mobile computing device, features of the first image to determine whether the first image is likely to be usable by an optical character recognition algorithm;
rejecting, by the mobile computing device, the first image in response to determining that the first image is not likely to be usable;
capturing, by the mobile computing device, a second image of the card in response to rejecting the first image;
analyzing, by the mobile computing device, features of the second image to determine whether the second image is likely to be usable by an optical character recognition algorithm; and
transmitting, by the mobile computing device, the second image to an optical character recognition system associated with the optical character recognition algorithm in response to determining that the second image is likely to be usable.

2. The computer-implemented method of claim 1, wherein a third image is captured upon receiving, by the one or more computer devices and from the optical character recognition system, an indication that the optical character recognition algorithm produced results that were below a configured threshold confidence level.

3. The computer-implemented method of claim 1, wherein the analyzing step comprises:
detecting, by the one or more computing devices, blur in the image; and
determining, by the one or more computing devices, that the image is likely to be usable by an optical character recognition algorithm upon a determination that an amount of blur detected in the image is below a configured threshold.

4. The computer-implemented method of claim 1, wherein the analyzing step comprises:
detecting, by the one or more computing devices, a level of brightness in the image; and
determining, by the one or more computing devices, that the image is likely to be usable by an optical character recognition algorithm upon a determination that the level of brightness detected in the image is between configured thresholds.

5. The computer-implemented method of claim 1, wherein the analyzing step comprises:
detecting, by the one or more computing devices, text in the image; and
determining, by the one or more computing devices, that the image is likely to be usable by an optical character recognition algorithm upon a determination that an amount of text detected in the image is above a configured threshold.

6. The computer-implemented method of claim 5, further comprising determining, by the one or more computing devices, that the image is likely to be usable by an optical character recognition algorithm upon a determination that the text detected in the image is in a location of the image that corresponds to a configured expected location.

7. The computer-implemented method of claim 1, wherein the card is a credit card, a debit card, an identification card, a loyalty card, an access card, or a stored value card.

8. A computer program product, comprising:
a non-transitory computer-readable storage device having computer-executable program instructions embodied thereon that when executed by a computer cause the computer to filter images, comprising:
computer-readable program instructions to capture a first image of a card;
computer-readable program instructions to analyze features of the first image to determine whether the first image is likely to be usable by an optical character recognition algorithm;
computer-readable program instructions to reject the first image in response to determining that the first image is not likely to be usable;
computer-readable program instructions to capture a second image of the card;
computer-readable program instructions to analyze features of the second image to determine whether the second image is likely to be usable by an optical character recognition algorithm; and
computer-readable program instructions to transmit the second image to an optical character recognition system associated with the optical character recognition algorithm in response to determining that the second image is likely to be usable.

9. The computer program product of claim 8, wherein the second image is obtained upon receiving, from the optical character recognition system, an indication that the optical character recognition algorithm produced results that were below a configured threshold confidence level.

10. The computer program product of claim 8, wherein the analyzing step comprises:
computer-readable program instructions to detect blur in the image; and
computer-readable program instructions to determine the image is likely to be usable by an optical character recognition algorithm upon a determination that an amount of blur detected in the image is below a configured threshold.

11. The computer program product of claim 8, wherein the analyzing step comprises:
computer-readable program instructions to detect a level of brightness in the image; and
computer-readable program instructions to determine that the image is likely to be usable by an optical character recognition algorithm upon a determination that the level of brightness detected in the image is between configured thresholds.

12. The computer program product of claim 8, wherein the analyzing step comprises:
computer-readable program instructions detect text in the image; and
computer-readable program instructions to determine that the image is likely to be usable by an optical character recognition algorithm upon a determination that an amount of text detected in the image is above a configured threshold.

13. The computer program product of claim 12, further comprising computer-readable program instructions that cause the system to determine that the image is likely to be usable by an optical character recognition algorithm upon a determination that the text detected in the image is in a location of the image that corresponds to a configured expected location.

14. A system to filter images, the system comprising:
a storage resource;

a processor communicatively coupled to the storage resource, wherein the processor is configured to execute computer-readable instructions that are stored in the storage resource and that cause the system to:
receive a first image and a second image of a card;
analyze features of the first image to determine whether the first image is likely to be usable by an optical character recognition algorithm;
reject the first image in response to determining that the first image is not likely to be usable;
analyze features of the second image to determine whether the second image is likely to be usable by an optical character algorithm; and
transmit the first image to an optical character recognition system associated with the optical character recognition algorithm in response to determining that the first image is likely to be usable.

15. The system of claim 14, wherein the second image is received upon receiving, from the optical character recognition system, an indication that the optical character recognition algorithm produced results that were below a configured threshold confidence level.

16. The system of claim 14, wherein the analyzing step comprises computer-readable instructions that cause the system to:
detect blur in the image; and
determine the image is likely to be usable by an optical character recognition algorithm upon a determination that an amount of blur detected in the image is below a configured threshold.

17. The system of claim 14, wherein the analyzing step comprises computer-readable instructions that cause the system to:
detect a level of brightness in the image; and
determine that the image is likely to be usable by an optical character recognition algorithm upon a determination that the level of brightness detected in the image is between configured thresholds.

18. The system of claim 14, wherein the analyzing step comprises computer-readable instructions that cause the system to:
detect text in the image; and
determine that the image is likely to be usable by an optical character recognition algorithm upon a determination that an amount of text detected in the image is above a configured threshold.

19. The system of claim 18, further comprising computer-readable instructions that cause the system to determine that the image is likely to be usable by an optical character recognition algorithm upon a determination that the text detected in the image is in a location of the image that corresponds to a configured expected location.

* * * * *